United States Patent [19] [11] 4,193,953
Langen et al. [45] Mar. 18, 1980

[54] HYDROSOL DROPLET CASTING PROCESS FOR PRODUCTION OF NUCLEAR FUEL AND BREEDER MATERIAL GRANULES

[75] Inventors: Hans Langen, Jülich; Helmut Ringel, Niederzier-Hambach; Erich Zimmer, Jülich, all of Fed. Rep. of Germany

[73] Assignee: Kernforschungsanlage Jülich Gesellschaft mit beschrankter Haftung, Jülich, Fed. Rep. of Germany

[21] Appl. No.: 925,978

[22] Filed: Jul. 19, 1978

[30] Foreign Application Priority Data

Jul. 23, 1977 [DE] Fed. Rep. of Germany ....... 2733384

[51] Int. Cl.² ............................................. G21C 21/00
[52] U.S. Cl. .............................. 264/0.5; 252/301.1 S; 423/252
[58] Field of Search .................. 264/0.5; 252/301.1 S; 423/252

[56] References Cited

U.S. PATENT DOCUMENTS

| 3,345,437 | 10/1967 | Flack et al. ...................... 423/252 X |
| 3,586,742 | 6/1971 | Chin et al. ....................... 423/252 X |
| 4,060,497 | 11/1977 | Huschka et al. ...................... 264/0.5 |

FOREIGN PATENT DOCUMENTS 2147472 11/1976 Fed. Rep. of Germany .
2,323,010 3/1978 Fed. Rep. of Germany .

OTHER PUBLICATIONS

Brambilla et al., Energia Nucleare, vol. 17, No. 4, Apr. 1, 1970, pp. 217 to 224.
Vygen et al., Kerntechnik, vol. 12, No. 4, 1970, pp. 159 to 164.

Primary Examiner—Leland A. Sebastian
Attorney, Agent, or Firm—Frishauf, Holtz, Goodman & Woodward

[57] ABSTRACT

A hydrosol containing, in nitrate form, a fuel or fuel-and-breeder material which is projected horizontally in the form of droplets into a gas phase containing gaseous ammonia and allowed to fall in a drip-casting column into a precipitation bath containing ammonium hydroxide. In the gas phase, the droplets are hardened just enough to prevent their deformation upon penetrating into the precipitation bath where the hardening is completed. A falling height of 5 cm is suitable. The granules are washed free of ammonium nitrate, then dried, and then sintered. The heavy metal content in the hydrosol is between 1.5 and 3 moles per liter, and the pH value of the precipitation bath is between 8 and 9. The hydrosol contains the heavy metal in oxide form and the process can be used with a thorium oxide hydrosol or a hydrosol that, in addition to thorium oxide, contains the oxide of hexavalent uranium, in the latter case the hexavalent uranium being present in a proportion up to 25% by weight of the total heavy metal. The process is also applicable to producing kernels of mixed thorium and plutonium oxides. In the case of uranium-containing granules, the sintering step is carried out in a reducing atmosphere to convert the uranium to the tetravalent state.

3 Claims, No Drawings

HYDROSOL DROPLET CASTING PROCESS FOR PRODUCTION OF NUCLEAR FUEL AND BREEDER MATERIAL GRANULES

This invention concerns the manufacture of fuel and/or breeder kernels for fuel elements of nuclear reactors. In such manufactures, drops of a breeder or fuel and breeder-containing hydrosol are caused to fall through a gas phase containing gaseous ammonia into a precipitation bath containing ammonium hydroxide, the hydrosol being injected substantially horizontally into the gas phase above the precipitation bath in droplet form, so that it enters into the precipitation bath under the influence of gravity.

In the fuel elements of nuclear reactors, the fissionable material uranium and the breeder material thorium is provided in the form of spherical grains or kernels having a diameter of from 0.2 to 0.6 mm. For high temperature reactors, breeder cores of thorium oxide, $ThO_2$, or mixed oxide cores containing thorium and uranium $(Th,U)O_2$, are used.

For the manufacture of fuel and/or breeder kernels, a series of processes are known. The wet chemical processes have succeeded in getting into use because of their superior product quality. In these processes a water solution or an aqueous collodial suspension designated as a hydrosol, in which the fuel and/or breeder material is contained is dispersed into individual drops. These drops are then solidified by a chemical reaction. The greenware particles thus produced—if necessary or desirable after a washing step—are dried and then sintered to produce ceramic kernels or granules.

In this manner, for example, processes have been described in which a partially neutralized solution of thorium nitrate or of thorium uranyl nitrate is dripped into a water solution of ammonia (*Energia Nucleare*, 1970, pp. 217-224; *Kerntechnik*, 1970, pp. 159-164). In these processes the drops are solidified by a gelification reaction. In order that the drops should survive the impact onto the surface of the ammonia solution without distortion, two precautions have been regarded as necessary. In the first place, the drops must react with gaseous ammonia before falling into the ammonia solution in order that at least a surface hardening of the drops may be obtained. Furthermore, the addition of substantial quantities of a polymeric water soluble material has been required in order to increase the viscosity of the drops. As a thickener for this purpose, methyl cellulose and polyvinyl alcohol have been found effective.

The addition of these organic polymers as thickeners, however, brings about substantial disadvantages for the carrying out of the process of which a few of the more important are named in the following discussion. The concentration of $Th(NO_3)_4$ an $UO_2(NO_3)_2$ in the solution is limited a relatively small value ($\leq 0.7$ mole/l) by the addition of the polymers, since the solution of the required quantity of the thickener is no longer possible at higher concentrations of the nitrates. This limits the heavy metal throughput in the pouring (casting) apparatus since at lower concentrations it is necessary to produce larger drop diameters.

Furthermore, the thickeners cannot be washed out of the greenware spheres by water or solvents. After they are dried, a calcination stage is necessary, in which the organic material is decomposed and burned up. This reaction is exothermic and damage or destruction of the kernels can be prevented only with slow progress of the reaction and careful control of the reaction conditions. In addition, it is important to wash the greenware cores previous to the calcination step with a lower alcohol, for example, isopropanol. Finally, the macromolecules of the thickener are partly destroyed by the high radioactivity of these solutions upon their addition to solutions that are produced in the treatment of nuclear fuel materials. The viscosity of the solutions then sinks. Since a constant viscosity of the pouring solution is nevertheless to be desired for the process here in question for the manufacture of fuel and/or breeder materials, the processes above mentioned for the reprocessing of fuel and/or breeder materials is feasible only with great additional expense.

In order to avoid the disadvantages mentioned above, processes have also been proposed that operate without the addition of a thickener. Thus, for example, a process is known from German Pat. No. 21 47 472 in which the drops are formed and prehardened in a liquid ketone phase that has a low ammonia concentration, before the hardening is completed in an aqueous ammonia solution located beneath the ketone phase. In this process, the nozzle for the generation of drops must be immersed in the ketone phase, which naturally leads to a lower drop frequency than in spraying into a space filled with gas. In order to prevent the stopping of the jet orifice, it is necessary to use a dual-flow nozzle, in which an outer surrounding stream of ammonia free ketone prevents the contact of the ammonia-containing ketone with the heavy metal solution or sol. When a ketone flowing out of the drop-pouring column is used as the surrounding stream, this material must be suitably prepared.

SUMMARY OF THE INVENTION

It is an object of the present invention to provide a process for manufacturing spherical fuel and/or breeder kernels or granules in which a hydrosol can be dripped into an aqueous ammonia solution at high drop frequency without the addition of a viscosity-increasing macromolecular substance. In addition, the economy of the manufacturing process should also be increased with this improvement.

The starting point of the invention is an unpublished suggestion that a water solution or a hydrosol in which a heavy metal is dispersed should be injected into a gas-filled space above a liquid aqua ammonia phase at an angle of 90° to the normal to the liquid surface of the precipitation bath, thereby providing a favorable relation between the prehardening of the drops in the gas phase and the impact velocity.

Briefly, in a process of the general kind above described, a hydrosol containing thorium oxide in addition to thorium oxide, uranium (VI) oxide with the content of hexavalent uranium constituting up to 25% by weight of the aggregate heavy metal content, such that the heavy metal is contained in the hydrosol at a concentration between 1.5 and 3 moles per liter, is used and the precipitation bath is adjusted at a pH value of between 8 and 9. With horizontal injection of the drops and increase of the heavy metal concentration, the result is obtained that the hydrosol drops can be cast round without utilization of a thickener. As a result of the high heavy metal concentration of the hydrosols, the drops solidify in the gas phase substantially more strongly than in the case of hydrosols of lower concentration. Yet with the compositions of the precipitation bath conventional up to now, the drops falling into the bath would disintegrate upon increase of the heavy metal concentration. Surprisingly, it has been found that in combination with the previously described drop-casting conditions, the provision of a pH value in the precipitation bath in the range of from 8 to 9 prevents the disintegration of the drops, the pH value to be provided in the individual case being dependent substantially upon the parameters of heavy metal content, uranium content, and drop size.

In accordance with a further development of the invention, it is useful to maintain the ammonium nitrate concentration at at least three moles liter in order to maintain the pH within the desired value range. The pH value is then determined by the buffering system $NH_4^+/NH_3$. Preferably, the precipitation bath has an aqua ammonia concentration between 0.5 and 3% by weight. The hydrosols and the gels produced therefrom, of course, have high ammonium nitrate concentrations as a result of the precipitation reaction, according to the equation

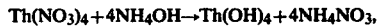
$$Th(NO_3)_4 + 4NH_4OH \rightarrow Th(OH)_4 + 4NH_4NO_3,$$

with the ammonium nitrate being in part washed out in the precipitation bath. It is, however, necessary to provide adjustment of the concentration value in the startup phase by the addition of ammonium nitrate or by substitution, for the ammonia-containing liquid bath, of a corresponding process step. The ammonium nitrate concentration can preferably be measured by measuring the electrical conductivity of the precipitation bath, and regulated in dependence thereon.

In development of the invention, it is further contemplated that the hydrosol should be dripped at temperature of between 30° C. and 60° C. The dripping of a tempered hydrosol increases the yield of fuel and/or breeder cores having a quality satisfying strict requirements.

In processes according to the invention, it is possible not only to utilize without difficulty highly concentrated hydrosols in a dripping process but also to dry and sinter immediately thereafter the fuel and/or breeder material grains without problems. Excess ammonium nitrate that adheres to the gel spheres taken from the precipitation bath are washed out in a water bath in which wash water containing about 1% by weight of ammonium hydroxide and a small quantity of surfactant is added. The drying of the gel spheres is then performed in air with a sufficient water vapor content, a process step already known from German published patent application (AS) 23 23 010. The process according to the present invention is particularly distinguished by uniformly high quality of the fuel and/or breeder kernels or granules produced. Yields greater than 99% can be obtained.

An apparatus for carrying out the process of the invention is shown in the not previously known German patent application P 27 14 873.8-33 owned by the assignee of the present invention, which will be published in accordance with the German patent application procedure in due course.

Examples of the process of the invention are set forth below. The hydrosols having high concentration of heavy metal are produced as follows.

$ThO_2$ hydrosols are quite simply produced by addition of gaseous or dissolved ammonia to solutions of $Th(NO_3)_4$. The precipitate thus produced can easily be colloidally suspended by stirring at increased temperature, preferably at 95±10° C. After introduction of 80-90% of the aqua ammonia quantity which is necessary for a complete precipitation, an aquasol is obtained in which the precipitation is almost reached. The sols are stabilized by hydrogen ions and have a pH value of about 3. For the production of the mixed oxide grains of $(Th,U)_2$, up to a Th:U ratio of 3:1, solutions can be used as starting materials for the sol production that contain $UO_2(NO_3)_2$ in addition to $Th(NO_3)_4$.

EXAMPLE 1

2.5 moles of $Th(NO_3)_4.5H_2O$ were dissolved in 0.5 liter of $H_2O$ and the solution was heated to 80° C. Beginning at this temperature, $NH_3$ gas was introduced through the shaft of the stirrer. The temperature then rose as a result approximately to the boiling point of the solution of about 110° C. After an hour 85% by weight of the amount of ammonia gas necessary for the complete precipitation reaction had been introduced. In the course of an additional hour, an additional 5% amount of ammonia by weight was gradually introduced. After cooling the hydrosol was filled out with $H_2O$ to the volume of 1 liter. The hydrosol thus prepared was cloudy-white and at 20° C. had a viscosity of $\eta = 8$ cP and a pH value of 3.5.

This hydrosol was dripped in a drip casting column having at the bottom a precipitation bath containing aqua ammonia and thereabove an ammonia-containing gas phase. The hydrosol was injected in drop form at 40° C. horizontally into the gas phase at a velocity allowing the drops to fall through the gas phase by gravity until they fell into the precipitation bath. The height through which the drops fell in the drip casting column was 5 cm. The height was so chosen that the prehardening of the drops in the gas phase is just sufficient to prevent permanent deformation of the drops upon hitting the surface of the precipitation bath. The hydrosol was drip-cast at a drop frequency of 400 HZ with a drop diameter of 1.24 mm. The precipitation bath contained 5 moles per liter of ammonium nitrate and 1% by weight of ammonium hydroxide. The gel spheres produced in this manner were washed free of ammonium nitrate with water that contained 0.01% of surfactant which is available under the common commercial designation "Span 80" and was then dried at 250° C. at an atmosphere containing water vapor. The cores of $ThO_2$ thereafter sintered had a diameter of 500 μm with good spherical shape, and a density of 99.8% of that theoretically possible. The yield was 99.9%.

EXAMPLE 2

2.4 moles of $Th(NO_3)_4.5H_2O$ were dissolved together with 0.6 moles of $UO_2(NO_3)_2.6H_2O$ in 0.5 liter of water that had been heated to 80° C. and—as described in Example 1—was converted to a hydrosol of 1 liter.

The prepared hydrosol that had an intense dark red color, had a viscosity of 6.5 cP. The pH value measured was 3.2.

The hydrosol—warmed to a temperature of 30° C.—was drip-cast in the same manner as in Example 1. The washing and drying of the gel spheres was also carried out in the same manner as in Example 1. The high temperature treatment, however, was carried out so as to reduce the hexavalent uranium to tetravalent uranium, in a reducing atmosphere of argon with 4% by weight of hydrogen. The results were comparable to those of Example 1.

EXAMPLE 3

1.5 moles of $Th(NO_3)_4 \cdot 5H_2O$ were dissolved in hot water of a temperature of 80° C. and—as described in Examples 1 and 2—converted into a $ThO_2$ hydrosol of a volume of one liter. The hydrosol had a pH value of 4.0 and a viscosity of 10 cP. The hydrosol was drip-cast at a temperature of 60° C. The remaining treatment corresponded to that given in Example 1. The sintered $ThO_2$ granules had a diameter of 400 μm.

The performance of the process with an ammonia-hydroxide concentration in the precipitation bath in the range between 3 and 5 moles per liter brought about comparable results. In addition to use for the production of fuel and breeder particles of thorium oxide or granules containing thorium-uranium mixed oxides, it is also possible to apply the process to the manufacture of thorium-plutonium mixed oxide granules.

Although the invention has been illustrated by means of particular examples, it is evident that variations and modifications are possible within the inventive concept.

We claim:

1. A method of producing breeder or fuel and breeder kernels for fuel elements of nuclear reactors comprising the steps of:
   making a hydrosol containing a dispersed particle phase selected from the group consisting of thorium oxide and mixtures thorium oxide and uranium (VI) oxide which mixtures have a hexavalent uranium content not exceeding 25% by weight of the aggregate amount of heavy metal, and hydrosol having a heavy metal concentration between 1.5 and 3 moles per liter, and
   injecting said hydrosol substantially horizontal in the form of drops into a gas phase enriched with ammonia gas overlying an ammonium hydroxide containing precipitation bath held at a pH value between 8 and 9, so that said drops fall by gravity through said gas phase while being affected by the ammonia content thereof and are immersed in said precipitation bath and hardened therein.

2. A method as defined in claim 1 in which said precipitation bath contains ammonium nitrate at a concentration of at least 3 moles per liter.

3. A method as defined in claim 1 or 2 in which the injection of said hydrosol into said gas phase in the form of drops is carried out at a hydrosol temperature between 30° C. and 60° C.

* * * * *